(12) United States Patent
Salt et al.

(10) Patent No.: US 8,701,128 B2
(45) Date of Patent: Apr. 15, 2014

(54) METHOD, SYSTEM AND COMPUTER PROGRAM PRODUCT FOR A CLIENT APPLICATION PROGRAMMING INTERFACE (API) IN A SERVICE ORIENTED ARCHITECTURE

(75) Inventors: Daniel Ian Salt, Colchester (GB); Augusto Remon Sellhorn, Tampa, FL (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 13/026,807

(22) Filed: Feb. 14, 2011

(65) Prior Publication Data
US 2012/0210335 A1 Aug. 16, 2012

(51) Int. Cl.
*G06F 3/00* (2006.01)
(52) U.S. Cl.
USPC .......................................... 719/328; 719/330
(58) Field of Classification Search
USPC .................................................. 719/328, 330
See application file for complete search history.

(56) References Cited

U.S. PATENT DOCUMENTS

| 5,481,721 | A | * | 1/1996 | Serlet et al. ................... 719/315 |
| 6,832,243 | B1 | | 12/2004 | Mikalsen et al. |
| 6,934,948 | B2 | | 8/2005 | Mikalsen et al. |
| 7,028,312 | B1 | * | 4/2006 | Merrick et al. ............... 719/330 |
| 7,536,481 | B2 | * | 5/2009 | Sekaran et al. ............... 709/248 |
| 7,653,008 | B2 | | 1/2010 | Patrick et al. |
| 7,676,472 | B2 | | 3/2010 | Kurhekar et al. |
| 7,739,228 | B1 | | 6/2010 | Erickson et al. |
| 2003/0009401 | A1 | * | 1/2003 | Ellis ................................ 705/35 |
| 2003/0093500 | A1 | | 5/2003 | Khodabakchian et al. |
| 2004/0122720 | A1 | | 6/2004 | Mikalsen et al. |
| 2006/0106842 | A1 | | 5/2006 | Diament et al. |
| 2006/0265720 | A1 | * | 11/2006 | Cai et al. ...................... 719/330 |
| 2008/0140857 | A1 | | 6/2008 | Conner et al. |
| 2008/0147777 | A1 | | 6/2008 | Azulai |
| 2008/0172675 | A1 | | 7/2008 | Mikalsen et al. |
| 2008/0201408 | A1 | | 8/2008 | Behera et al. |
| 2008/0235710 | A1 | | 9/2008 | Challenger et al. |
| 2009/0193057 | A1 | | 7/2009 | Maes |
| 2010/0324962 | A1 | * | 12/2010 | Nesler et al. ..................... 705/8 |

FOREIGN PATENT DOCUMENTS

WO 0215008 A2 2/2002

OTHER PUBLICATIONS

Miikka, Implementing SOA in an ESB Framework, 2006.*

* cited by examiner

*Primary Examiner* — Lechi Truong
(74) *Attorney, Agent, or Firm* — Fletcher Yoder, P.C.

(57) ABSTRACT

Described are a client application-programming interface (API) in a service oriented architecture (SOA). A system includes an application client having application code, one or more service interfaces, and a processor. An enterprise service bus (ESB) having a service registry connects one or more service implementations with the application client through the ESB. A processor is configured to execute the application code to invoke at least one of the one or more service interfaces and request at least one of the one or more service implementations via a request message. The request message comprises application code language based objects requesting a service. The processor is further configured to dynamically create a service instance for the service message. The service instance comprises the service message formatted for transport in the ESB and an endpoint reference for the one of the one or more service implementations as determined by the service registry.

18 Claims, 4 Drawing Sheets

METHOD, SYSTEM AND COMPUTER PROGRAM PRODUCT FOR A CLIENT APPLICATION PROGRAMMING INTERFACE (API) IN A SERVICE ORIENTED ARCHITECTURE

CROSS-REFERENCE TO RELATED APPLICATION

This application is related to U.S. patent application Ser. No. 13/026,792, filed on Feb. 14, 2011, and entitled "METHOD, SYSTEM AND COMPUTER PROGRAM PRODUCT FOR EXTENSIBLE SERVICE REGISTRY FOR SERVICE ORIENTED ARCHITECTURE ENDPOINTS" which is fully incorporated herein by reference and made a part hereof.

BACKGROUND OF THE INVENTION

An application programming interface (API) is an interface implemented on one or more computing devices by a software program that enables it to interact with other software. It facilitates interaction between different software programs similar to the way the user interface facilitates interaction between humans and computers. An API is implemented by applications, libraries, and operating systems to determine their vocabularies and calling conventions, and is used to access their services. It may include specifications for routines, data structures, object classes, and protocols used to communicate between the consumer and the implementer of the API.

Service-oriented architecture (SOA) is a flexible set of design principles used during the phases of systems development and integration. A deployed SOA-based architecture provides a loosely integrated suite of services that can be used within multiple business domains. Specifically, SOA embodies at least some of the characteristics of implementation independence, service reusability, loose coupling, service abstraction, and service composability.

Implementation independence refers to keeping services as implementation neutral as possible in order to facilitate maximum reusability. Service reusability refers to the goal of SOA to form applications that are built almost entirely from existing software services. Each service provides certain functionality, the larger the function is, the fewer the interface points are required. However, very large functionality may result in services that are not granular enough to be easily reused. The key is that there are no interactions between functions specified within the service. Loose coupling is a principle about interfaces having minimal assumptions between the sending and receiving parities. This reduces the risk that a change in one module will force a change in another module. Loose coupling means multiple dimensions. For the purpose of service contract, this principle focuses on using canonical model to decouple the service input output from proprietary data models. It also focuses on separating business logic from integration logic. Message routing, data transformation, integration patterns, and other integration related functions are handled by a software services infrastructure (SSI) so that services are decoupled from the underlying systems. Service abstraction refers to the relationship between a service and its underlying implementation. The right level of service abstraction is key to remove point-to-point interfaces. For example, advanced metering infrastructure (AMI) integration requires knowledge about meters and end devices. A service can be easily defined based on such information. The implication is that each consuming parties needs to understand the meters and end devices which requires data synchronization efforts for them to be synchronized with AMI system. An entity can have many products that need to interface with AMI data. Rather than providing a point-to-point interface between the products and the AMI data, a service defined on a more abstracted level, premise level, allows each individual system to have the knowledge about meters and end devices. A common component can be built to handle the relationship between premises and meters so that such integration and data synchronization only needs to be built once. The purpose of composability is to support service composition and orchestration so that new applications and processes can be built on top of existing services. Although this principle is related to service reusability and loose coupling, it provides extra guidelines for service identification. Each service should have a clear definition for its function and purpose so that it can be registered with a clear service semantics and ready for discovering. Redundant services should be avoided. No matter whether or not immediate composition requirements are already in existence, service composability should be considered for maximizing opportunity for service composition and orchestration.

Prior SOA systems used specific software code in an application client and in any implementation accessed by the client. For example, before the use of an Enterprise Service Bus (ESB), as known to one of ordinary skill in the art, any application client that wished to access implementations that existed remotely needed to include client code that communicated over the necessary transport for that implementation.

As shown in (prior art) FIG. 1, the application client 102 adopts a SOA approach and separates the "Server Code" 104 from the "Application Code" 106 via wrapper classes 108, where the wrapper classes encapsulate the necessary communication logic for the intended wire protocol (e.g., JMS, HTTP, Web Services, etc.), typically accessing the wrapper classes 108 using an interface that represents the service. In such architecture, the application client 104 is generally required to support client/server code for each type of transport it requires (e.g. JMS, HTTP, Web Services, etc); write and maintain the wrapper classes 106; and store the physical locations of each implementation in a configuration. At runtime, the application client 102 causes the application code 106 to invoke the wrapper class 108; the wrapper class 108 creates the necessary transport-level API objects; the wrapper class 108 creates the service message and sends it to the physical location of the implementation 110; the wrapper class 108 processes the response and converts it back from message to objects; and the wrapper class 106 returns the return object.

As shown in FIG. 1, each implementation 110 supports server code 104 for the chosen transport it uses to expose its functionality. At runtime, the server code 104 decodes the message received from the transport and invokes the necessary code for the service. At runtime, the server code 104 creates server components using the chosen transport API to listen for the incoming message; receives the message and decodes it into objects; invokes the implementation and receives the return object; encodes the response object into the message format; and returns the message via the transport API. The application client 102 includes a processor 114 for executing the application code 112 and other associated software. The implementations 110 can be associated with the processor 114 or one or more other processing devices (not shown).

FIG. 2 illustrates an embodiment of a SOA that comprises an ESB 202. An ESB 202 architecture is a logical architecture where components communicate over a bus. In one aspect, the bus supports standard Message Exchange Patterns (Request-Reply, Publish-Subscribe, etc). In one aspect, an ESB 202 uses physical transports (for example JMS, HTTP, TCP, In-Memory) to move data between ESB endpoints. Components on an ESB can typically be grouped into two main types: a) components that receive or deliver data; and b) components that operate on or manipulate the data.

The components that receive or deliver data operate either as a source or a destination (either final or intermediate) of the message data. Some components can function as both a source and destination. They can be varied in their functionality and include examples such as: JMS Queues and topics; files; databases; log files; Java Beans; Enterprise Java Beans (EJB); mail servers; HTTP servers; and the like. Each component receives the message data and processes it according to the operations it supports. For example, a file component can persist the message data to a file. A mail server can send the message data to a recipient (as described in the message headers). Each component can be configured on the bus as to how it operates and stores/sends the message data.

The components that operate on or manipulate the data simply act on the data before it moves to the next stage in the ESB route. Examples of such components are: transformation components (XSLT files, Java transformation components, etc.); content-based routing components; filters; splitters; aggregators; delays; multicasters; and the like. These components either change the content of the message, or change the next recipient of the message, or both. These components are sometimes referred to as Enterprise Integration Patterns (EIPs).

With the use of an ESB 202, both application client 204 and implementation 206 are greatly simplified. As shown in prior art FIG. 2, each implementation 206 delegates all the "transport-specific" code to the ESB 202. Therefore, the implementation 206 only has to be concerned with processing the incoming message and invoking the necessary code. The functions of the application client 204 are also simplified. It can choose how it communicates with the ESB 202, since the ESB 202 will abstract away the processes necessary to communicate with the implementation(s) 206. The ESB 202 can also (not shown) include routing information to decide which implementation 206 to use for a particular client 204 or message. The application client 204 needs to support client/server code for its chosen type of transport between the client and ESB 202 (for example, JMS); write and maintain the wrapper classes 208; and store the physical locations of each ESB endpoint 210 in its configuration. At runtime, the application client 204 invokes the wrapper class 208 with its application code 212; the wrapper class 208 creates the necessary transport-level API objects; the wrapper class 208 creates the service message and sends it to the physical location of the implementation 206; the wrapper class 208 processes the response and converts it back from message to objects; and the wrapper class 208 returns the return object.

Each implementation 206 decodes the message received from the ESB 202 and invokes the necessary code to provide the service. At runtime, the implementation 206 receives the message from the ESB 202 and decodes it into objects; invokes its business logic; generates a return object (if a response is required); encodes the response object into the message format; and returns the message via the transport API. The application client 204 includes a processor 214 for executing the application code 212 and other associated software. The implementations 206 can be associated with the processor 214 or one or more other processing devices (not shown).

However, in each of the above instances, the application client maintains additional code to interface with the service implementation. Therefore, methods, systems and computer program products that overcome challenges in the present state of the art, some of which are described above, are needed.

BRIEF DESCRIPTION OF THE INVENTION

In general, embodiments of the present invention provide an improvement by, among other things, providing a method, system and computer program product for a client application programming interface (API) in a service oriented architecture (SOA).

In one aspect, a system is described. The system is comprised of an application client. The application client further comprises application code, one or more service interfaces, and a processor. The system also comprises an enterprise service bus (ESB) having a service registry and one or more service implementations. The service implementations are connected with the application client through the ESB. In one embodiment, the processor is configured to execute the application code to invoke at least one of the one or more service interfaces; request at least one of the one or more service implementations via a request message, wherein the request message comprises application code language based objects requesting a service; and dynamically create a service instance for the service message, wherein the service instance comprises the service message formatted for transport in the ESB and an endpoint reference for the at least one of the one or more service implementations as determined by the service registry.

In another aspect, a computer-implemented method is described. One embodiment of the method comprises executing, by a processor, application code to invoke at least one of one or more service interfaces. The method further comprises requesting, by the application code executing on the processor, at least one of one or more service implementations via a request message. In one aspect, the request message comprises application code language based objects requesting a service. The method also comprises dynamically creating, by an invoker, a service instance for the service message. The service instance comprises the service message formatted for transport in the ESB and an endpoint reference for the selected one of the one or more service implementations as determined by a service registry.

In yet another aspect, a computer program product comprised of computer-executable code sections stored on one or more non-transitory computer-readable mediums is described. One embodiment of the computer-executable code sections comprises a first section for invoking at least one of one or more service interfaces. A second section is described for requesting at least one of one or more service implementations via a request message, wherein the request message comprises application code language based objects requesting a service. And, a third section is described for dynamically creating, by an invoker, a service instance for the service message. The service instance comprises the service message formatted for transport in the ESB and an endpoint reference for the selected one of the one or more service implementations as determined by a service registry.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Figure 1:
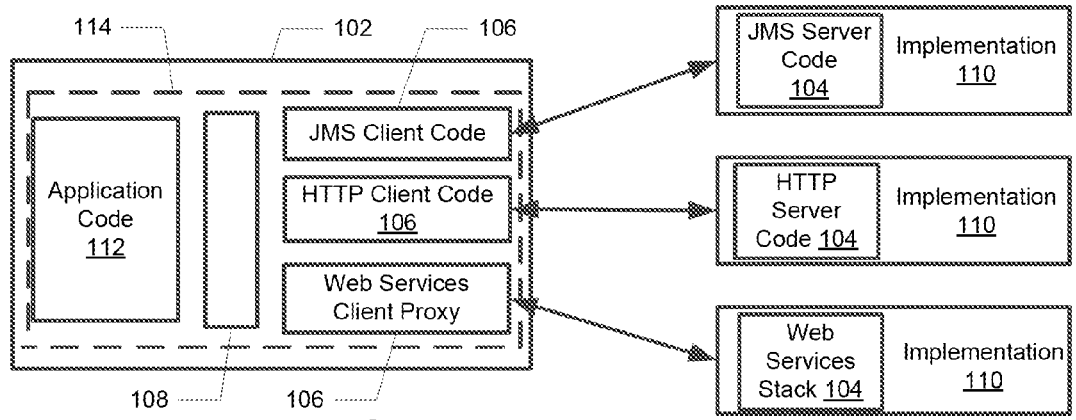
FIG. 1 is a prior art illustration of an embodiment of a SOA that does not employ an ESB.
Figure 2:
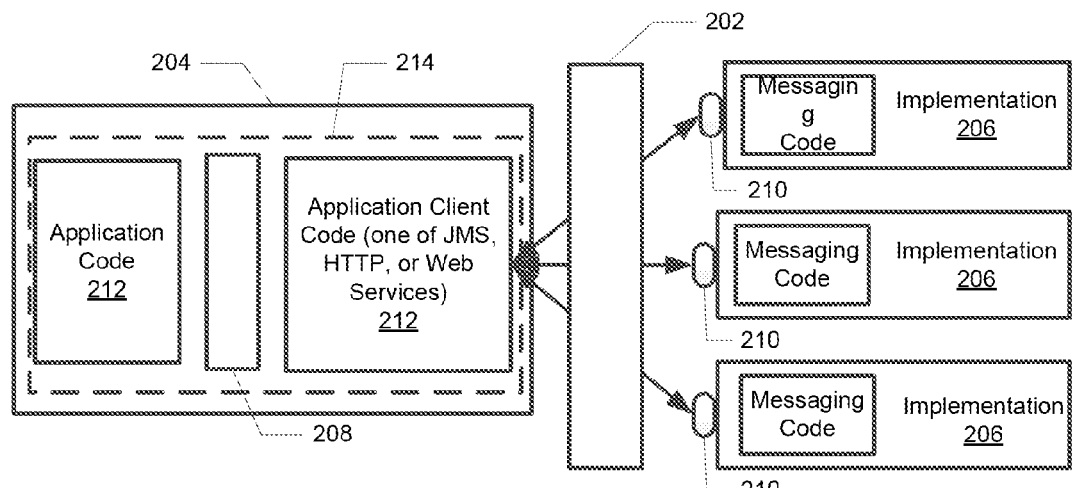
FIG. 2 illustrates an embodiment of a SOA that comprises an ESB.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 3:
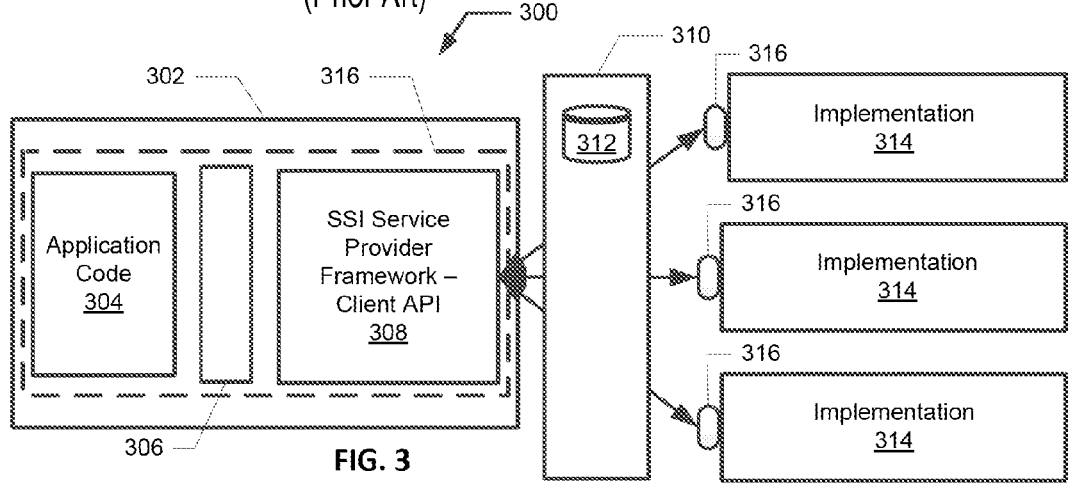
FIG. 3 illustrates an overview of one embodiment of a software systems infrastructure (SSI) for using a client API for service-oriented architecture (SOA)

FIG. 3 illustrates an overview of one embodiment of a software systems infrastructure (SSI) 300 for using a client API for service-oriented architecture (SOA). As shown in FIG. 3, the exemplary system is comprised of an application client 302. In one aspect, the application client 302 further comprises a processor, application code 304, one or more service interfaces 306, and a client application programmer interface (API) 308. The application client 302 also includes a processor 316 for executing software associated with embodiments of the invention. Further comprising the system of FIG. 3 is an enterprise service bus (ESB) 310, wherein the ESB 310 further comprises a service registry 312. The system 300 further comprises one or more service implementations 314. As shown in FIG. 3, each service implementation 314 is connected with the application client 302 through the ESB 310. This connection is a logical connection made through one or more wired or wireless networks, which can include the Internet.

In the exemplary system of FIG. 3, the application code 304 maintains no additional code (e.g., code for each type of transport it requires (e.g. JMS, HTTP, Web Services, etc)). The application code 304 only invokes the one or more service interfaces 306, which are provided by the software system infrastructure (SSI) utilizing the system 300. The client API 308 uses dynamically created invokers, created using a dynamic proxy factory to create a message and send it to the ESB 310. A dynamic factory creates any necessary client API artifacts (e.g., invokers, endpoints, etc) at runtime for a particular service interface. Alternatively, such artifacts can be created at code-time, using manual or code-generating methods, but this can make for increased effort and support by development teams. In one aspect, a dynamic factory works by accepting the service interface as a parameter, inspecting the service properties of the interface (e.g., method signature, etc) and dynamically creating the object (e.g., invoker, endpoint) and returning the object(s) to the caller. Additionally, the service registry 312 is used by the invoker at runtime to determine where to physically send the message, thus removing the need for the application client 302 to store the locations in its configuration.

The implementation 314 now only has to instantiate a pre-existing endpoint 316 (provided by the SSI), and configure it for the particular service (using the dynamic endpoint factory). The endpoint 316 can automatically register itself on the ESB 310 (and in the Service Registry 312) for clients to access. Only the service interface 306 needs to be code-generated for the SSI. No endpoint or invoker artifacts are required at compile-time. The application client 302 only needs to configure the client API 308 for the required services; and use the client API 308 to obtain an instance of the service interface 306, and invoke it. At runtime, the application code 304 creates a client API 308 instance. The application code 304 requests and obtains an instance of a service via a call such as, for example, getService( . . . ) where ( . . . ) denotes the argument of the call. For example, expressed in Java, an exemplary call can be MyExampleService ob=SPFClient.getService(MyExampleObjectService.class), which essentially defines: "provide an invoker that implements a desired service." The application code 304 invokes the service. The client API 308 uses the service registry 312 of the ESB 310 to obtain an endpoint 316 to send a message requesting a service. The client API 308 encodes the message and sends it to the designated endpoint 316. Once the response is delivered back to the application client 302 from the endpoint 316, the client API 308 receives the response and decodes it to objects. The invoker of the client API 308 returns the decoded response to the application code 304; therefore, the application code 304 is not burdened with the format of the message or the transport mechanism. Those overheads are abstracted away as described herein.

In one aspect, the implementation 314 configures the endpoint 316 and associates the endpoint 316 with the implementation 314. At runtime, the client API endpoint 314 receives the message requesting the service from the client API 308. The client API endpoint 314 decodes the message into objects and invokes the implementation 316. The implementation 314 performs its business logic (i.e., provides the service) and returns a result to the client API endpoint 314. The client API endpoint encodes the results into a message and returns the message to the ESB 310, where it travels to the application client 302.

An exemplary software services infrastructure (SSI) can comprise an application layer, an integration layer, one or more systems, and security components. In the context of an embodiment of a SSI, a "system" refers to another functional system, either providing or consuming data from the SSI. Systems can be, for example, data-stores, applications, analytics, etc. Examples of such systems include products, third-party systems, databases, and business processes. In one aspect, the SSI interacts with these end systems via data adapters, which may be specifically created for the SSI, or may be standard components that are included as part of the underlying infrastructure, or provided by third parties.

Figure 4:
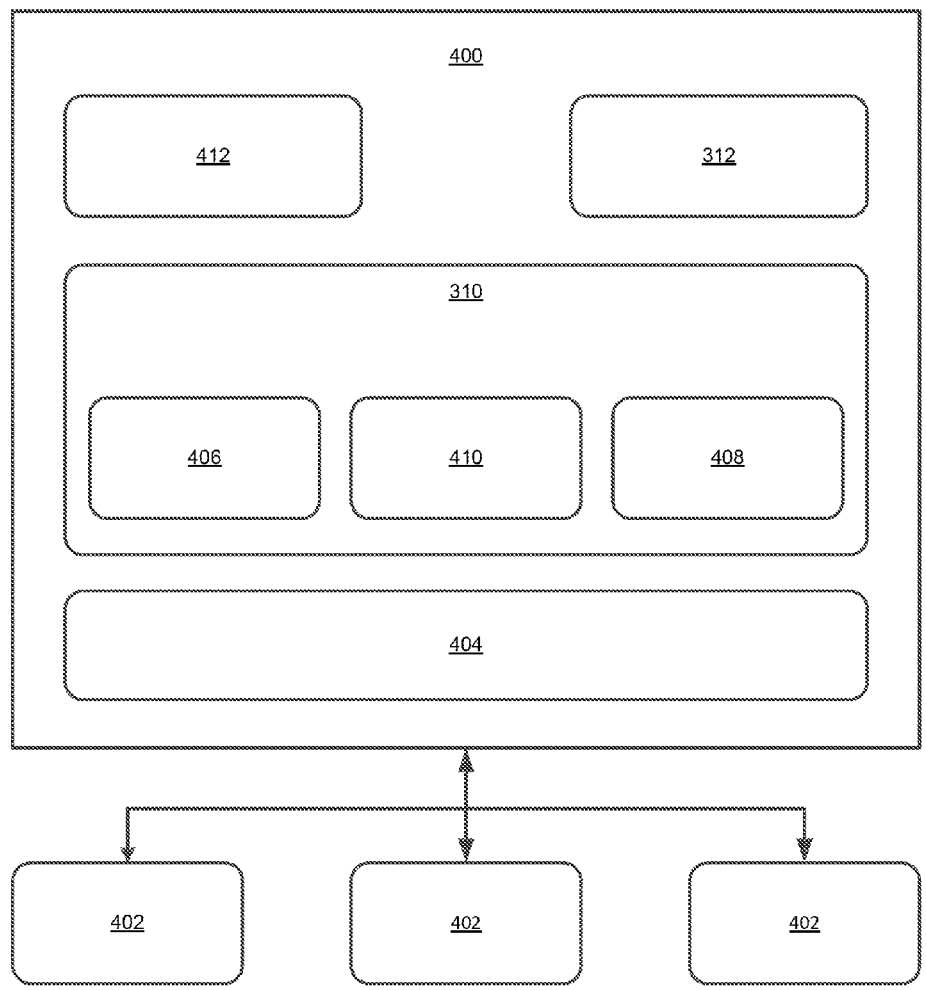
FIG. 4 illustrates an exemplary integration layer of an SSI.

FIG. 4 illustrates an exemplary integration layer 400 of an SSI. The integration layer 400 includes the architecture necessary to communicate with the end systems 402, and also to/from services within the SSI. In one aspect the integration layer 400 can follow an ESB (Enterprise Service Bus) architecture 310, as known to one of ordinary skill in the art.

As described above, an ESB architecture 310 is a logical architecture, where components communicate over a "bus." In addition to those described above, some other key capabilities of the ESB architecture 310 include error handling, and logging. Error handling refers to the ability of the ESB 310 to react to errors that occur during the course of a message passing between source and its final destination. Depending on the technology at the client and the final destination, the error may be presented in a number of ways. For example, a web service client component may receive a "fault" message to indicate an error, while a Java component may receive an "exceptions." The ESB 310 provides the ability to catch and process these errors, either en-route, or at the client. An error could be raised by a number of causes, for example: an error during the transmission of the message within the ESB 310 causes an ESB exception, which is passed back to the client (or caught by the SSI Client API and translated into a suitable exception); and an error in the "end system," which can be trapped by an adapter 404, or within code inside a component within the SSI (code-based integration pattern, service, etc). How the code reports the error may vary. If the service method supports returning an error code as part of it's signature, this may be done. If it is marked as throwing an exception, this may be done, which is marshaled by the ESB and returned to the client code as an exception. Untrapped exceptions can also be returned this way.

Logging can occur in the ESB 310 in a number of places. Within the code itself (for services, components, etc), using standard logging frameworks. The ESB 310 typically also allows messages to be routed to log files, or logging frameworks, so that messages can be audited and logged for debug or regulatory purposes.

Further comprising the exemplary integration layer 400 of an SSI as shown in FIG. 4 are one or more data adapters. In the context of the SSI, the service provider framework (SPF) uses the ESB architecture 310 to allow domain services to consume data from end systems 402, which are also attached to the ESB 310 via data adapters 404. Generally, the SPF encapsulates the functionality necessary for services, clients, and data adapters 404 to interact with the ESB 310. In one aspect, data adapters 404 can be a custom Java bean component that is responsible for taking the message data (which describes a service method call), and communicating with the end system. Data adapters 404 provide an endpoint on the ESB 310 that communicates with, and on behalf of, an end system 402. There are a number of different approaches for how a data adapter 404 interacts with the end system 402, and with the ESB 310, including in one aspect the data adapter 404 is logically part of the end system 402, and communicates remotely with the ESB 310 (e.g. via Web Services, JMS, etc); and in another aspect the data adapter 404 is logically part of the ESB 310, and communicates remotely with the end system 402, using whichever mechanisms the end system supports (e.g. database access, external interface, web services, etc). The data adapters 404 expose the interfaces described by the domain services in the application layer. They also provide the mappings between the entities described in the domain data model, and those expressed in the underlying end systems 402.

In one aspect, the ESB 310 provides capabilities to deliver messages from one endpoint to another. The description of how this is done, and what data transformations or data-flows happen en-route, is called a "route" 410. A route 410 contains a number of steps, where each step modifies or acts on the data in some way, before it reaches its destination. For Request-Reply exchanges, the resulting data is returned to the source endpoint. For Publish-Subscribe exchanges, the data flows only one way—from the publisher to the ESB, and then from the ESB out to each subscriber. The patterns used to modify or route the data are collectively known as integration patterns 406 or enterprise integration patterns, as known to one of ordinary skill in the art. Examples of integration patterns 406 include content-based routing, message filter, recipient list, splitter, aggregator, and the like. For a given domain area, there may also be other integration patterns 406. Some of these may be composed of other finer-grained patterns, while others may be written from scratch in code. For example, an example of an AMI (Advanced Metering Infrastructure) pattern could be a meter filter pattern, where several meter events occurring in quick succession are filtered, to avoid excessive or unnecessary notifications reaching the end system.

En-route to its destination, message data can be transformed 408 in a number of ways. For example, message data can be transformed 408 from one message schema to another (e.g. via XSLT, code transform). In one aspect, transformation 408 can occur using a custom Java transform, or using, for example, standard Apache Camel XSLT components (as are available from The Apache Software Foundation, Forest Hill, Md.). In another aspect, data values can be updated/replaced either to transform identifiers, add/replace default values, etc. In another aspect, splitting/aggregation can occur, which involves taking the same message and transform it into several smaller messages (or aggregate into a larger message).

In a typical ESB scenario, the names of each endpoint (called an endpoint reference—EPR) are known to the consuming or providing system. Even though the implementations behind each EPR can be changed, this still creates a dependency between one component on the ESB and another. In one aspect, the SSI requires that, at deploy-time, the endpoints that implement a specific service can be configured and changed, as required. The functional component that makes this possible is called the service registry 312. The service registry 312 is a per-SSI map of service interfaces, and the endpoints that implement them. At runtime, the consumer of a particular service makes a request to the service registry to retrieve the correct endpoint reference. As noted above, the service registry 312 is used by a service invoker 412 at runtime to determine where to physically send the message, thus removing the need for an application client 302 to store the locations in its configuration.

In various aspects, an SSI integration layer can support SOA Service Patterns/Message Exchange Patterns (MEPs) that include Request-Response; Request with Asynchronous Response (Callback); Publish-Subscribe; and the like. With Request-Response, the caller sends the message and waits for a response. The receiver (listening on the communication channel) receives the message, processes it, and returns a response. With request with asynchronous response (callback), the caller sends the message and waits for a response. The receiver (listening on the communication channel) receives the message and sends an acknowledgement that the request was received. When the work is done, the receiver sends the final result to the callback channel defined either in advance or by the initial message. With publish-subscribe, this pattern assumes an intermediary "broker." The "publisher" sends the message to the broker and receives an acknowledgement that it was received. Any number of "subscribers" may have registered interest in the particular channel (Topic). The broker dispatches the message to every listening "Subscriber," and receives an acknowledgement that the message was received.

Further comprising the exemplary SSI can be an application layer. The application layer comprises the components that comprise the domain-level services and data model—the building blocks of applications. The application layer is split into a number of functional layers including the common data model, domain services, applications, business processes, and business rules.

The common data model layer encapsulates the data model exposed to the services and applications. It provides a consistent view of the entities exchanged via messages with the end systems, and normalizes them, so that the applications can work against a single model. The domain services provide a consistent API to the consuming services and applications. This layer can itself be comprised of many sub-layers, with increasing levels of granularity. The lowest levels of domain services are provided by the data adapters. When a consuming application or service implements a low-level domain service, the appropriate data adapter is selected by using the service registry. Applications can refer to end-user applications, engines, analytics, composite services, etc. Applications are functional components that are built by combining domain services and additional logic to form the intended functionality. They are architecturally separate from domain services, and may be built by other teams, customers, project groups, etc. A business process is a well-defined, standards-based sequence of events, typically long running and contextual. A popular standard for business processes is BPMN (Business Process Modeling Notation), and its execution artifact counterpart, BPEL (Business Process Execution Language), as are known to one of ordinary skill in the art. A business process typically describes a very granular, high-level sequence of events that makes up a business use case. Each step in the process may execute a domain service, a third-party service, or request user interaction to decide on the next step to take in the process flow. Business rules supplement business processes and applications, by encapsulating business-level rules that affect the overall behavior of a process or application. Business rules are typically dynamic in nature, and encapsulate factors such as regulations, business relationships, and service-level agreements. In the domain of energy, an example could be specifying the rules that describes when to buy and sell energy, based on price, demand, regulations, etc.

In one aspect, the SSI represents and implements all interfaces as services. In one aspect, the SSI supports multiple technologies for service implementations, including but not limited to Web Services, Java Interfaces, etc. Services include the characteristics of implementation independence, service reusability, loose coupling, service abstraction, and service composability, which are described above in more detail.

In one aspect, the SSI provides a canonical view of the data and services provided by the underlying systems, to satisfy the requirements and use cases of the applications that leverage it. The underlying systems themselves may have their own data schemas and service definitions, either proprietary or based on industry standards. A typical ESB is responsible for translating between these different schemas and service interfaces, to route messages between systems. However, the SSI is more than just an ESB, and deals with more than just integration. When building a system that incorporates an application layer as well as an integration layer, a canonical service and data model is desired.

The consequence of not having a canonical model is that the applications themselves need to be aware which system they are interacting with. For example, imagine a Smart Grid scenario where the application is concerned with a meter. When the application communicates with an AMI system (for example) to read the meter, it needs to know the services and schema required to communicate with that system. It cannot take that same instance of a meter, and pass it to another system that deals with billing, for example. The application must translate the "AMI meter" instance into a "billing meter" instance. This makes the applications very aware of the systems they integrate with, and in doing so makes them difficult to maintain, and very solution-specific.

By creating a canonical model, the applications deal with a single "view of the world." It is then the responsibility of the integration layer—which is already optimized for translating data between different formats, to adapt the data to the correct format before sending to the end system. This principle doesn't only apply to service invocation. Configuration, security, and administration are all examples of other features that benefit from a single canonical view of the system.

Canonical services are derived in the same way that any interface is designed. The use cases for the applications (or, more specifically, the functional capabilities of the applications—e.g. meter control, premise control, etc) are expressed in a number of use cases. These use cases are then used to design a set of services. These services reference the canonical data model, such that all services reference the same data model. The service definitions and data model are transferred (either by tooling or by some other means) into a WSDL document. The WSDL document does not mandate a Web Services approach, it is used here as a standards-based document format for expressing the service interface and its operations. The WSDL document is then passed through tooling which generates language-specific, code-based interfaces (e.g. Java interfaces). These interfaces are used both in the client and in the implementation components as the contract that the client invokes, and the implementation provides. All interactions take place according to these interfaces. Additionally, the interfaces contain sufficient information to allow the SSI to marshal the service message data to/from its XML format. In Java, this is achieved using JAX-WS and JAX-B annotations, which instruct the JAX-B marshaler/unmarshaler how to generate XML, and how to process the message data.

As described herein, in one aspect the SSI ESB provides the core underlying capabilities of the integration layer. These capabilities include a mediation router, a Web Services framework, a message broker, logging, debugging, and security. The SSI is architected such that it can be deployed onto any ESB product, however in one instance the ESB can be Progress Fuse ESB, which is based on the following Apache products: (ESB) Apache Servicemix; (mediation router) Apache Camel; (message broker) Apache ActiveMQ; (services framework) Apache CXF (as are available from The Apache Software Foundation, Forest Hill, Md.).

The mediation router provides core functionality to the ESB—the ability to be able to route and transform messages from one functional "endpoint" to another. Enterprise Integration Patterns are provided as standard building blocks, and the router can be extended with other custom patterns as and when necessary. For transformation, it supports industry standards such as XSLT, and also allows custom code-based transformations to be used. Routes are configured either declaratively by configuration (e.g., a "Camel Context") or in code. The mediation router is a highly distributed architecture. It comprises of ESB "Contexts"—definitions that exist within each functional component and define how that component interacts with the ESB. This is accomplished by defining "Routes" and "Endpoints." Through the use of physical connectivity (e.g. JMS, HTTP, Web Services, etc), these individual ESB Contexts function as a single logical "bus." Because of its distributed nature, it is desired fro the mediation router to be scalable, both up and down. Therefore, it is desired that an ESB "Context" be able to be embedded in a number of different ways including as a component within the SSI "Node;" as a standalone component on another node (because of platform, performance, etc); or as an embedded component within another application/process.

In addition, the mediation router also enables the ESB components to interact with many other components. For example, components that enable interaction with JMS Queues/Topics (consuming and producing); HTTP/HTTPS Server (invoking and hosting); SOAP/Web Services Server (invoking and hosting); SMTP (Mail)—(sending to); Logging—(sending to); Database Tables (querying and updating); etc.

The mediation router does not provide the above capabilities; it merely provides a conduit to them. Each of the capabilities above is provided by another component in the ESB. For example, the mediation router provides the capability to invoke and host HTTP servers in the ESB, but does not actually provide the functionality of the HTTP Server. It would interact with another component (e.g., Jetty) to accomplish this. This enables best-of-breed components to be used for each, and means that the Mediation Router can be easily extended or modified to meet the needs of the solution.

In one aspect, the ESB services framework provides support for hosting Web Services, and the associated standards that accompany them (Security, Reliable Messaging, etc). As for the mediation router, this is architecturally separated in the ESB so that other implementations can be used if required. In one aspect, the Web Services framework in the underlying ESB platform supports a wide range of Web Services capabilities including Web Services Standards Support, frontends, ease of use, binary and legacy protocol support, and the like.

A message broker is a physical component of an ESB. While the ESB itself provides a logical "bus," the message broker is often used as the physical transport mechanism, connecting ESB endpoints to each other. The standard Message Broker architecture in Java is JMS (Java Messaging Server). The broker provides a mechanism for the ESB to transport messages between endpoints, and can do so with configurable levels of robustness. For example: guaranteed delivery—the message broker tries (a configured number of times) to deliver the message; at most once—the message broker ensures that the same message is not delivered more than once; persistence—the messages are persisted en-route, so that they can be "replayed" in the event of a broker failure.

The message broker has two kinds of delivery pattern for messages—queues and topics. Queues receive a message and deliver it to the first recipient who is listening on that particular queue. If multiple listeners exist, the behavior is implementation-specific, but typically the first registered listener will obtain the message, unless a failure occurs in that listener. Messages can also specify a "reply queue", to which any response to the message can be delivered. Typically the reply queue is temporary, and only listened to by the component that sent the original message, although other Request/Reply topologies are possible. A topic will receive a message and deliver it to all registered listeners (broadcast). Topics are generally used to implement the Publish/Subscribe MEP.

In one aspect, the service provider framework (SPF) encapsulates the functionality necessary for services, clients, and data adapters to interact with the ESB. In one aspect, it can include a client API, a service registry, and a runtime cache.

In one aspect, the client API includes the developer level components that enable the domain services to be exposed to clients. By leveraging the ESB, the client API decouples the client from the code necessary to invoke and return data for a particular service. In one aspect, the client API comprises invokers, endpoints, publishers and subscribers, request correlation, dynamic invoker/endpoint/subscriber factories, and SPFClient. In one aspect, some or all of these components are created dynamically.

In traditional ESB architectures, the invoking and consuming components are responsible for sending and receiving the data directly from the bus. One downside to this is that it makes the components aware of the various transport formats (XML, text, binary objects, etc). It also requires that every component that sends and receives data pertaining to a particular service must implement the code required to send/receive the request/response messages. The SPF breaks these dependencies using the invoker/endpoint components.

Generally, an invoker follows a service proxy pattern. It is a component that implements the service interface, and is used by the client. The client interacts with the invoker in the client's native language (e.g. Java). The invoker implements the code necessary to put the message onto the ESB, which then routes it to the correct destination. It does this by first querying the service registry, which returns the EPR (Endpoint Reference) to send the message to. If the service method is two-way (e.g. Request/Reply), then the invoker is also responsible for receiving the response, converting it back into a format the client understands (e.g. Java) and returning it to the client.

An endpoint sits at the opposite end of the ESB, listening on a particular EPR (Endpoint Reference), receiving the message that the invoker has placed onto the bus. The endpoint's role is to translate the message from the bus, and invoke the correct method on the implementation (e.g. Java). If the service method is two-way (e.g. Request/Reply), the endpoint is also responsible for taking the response from the implementation and converting it back into the ESB format.

A publisher is similar to an invoker. It exposes the event interface to the component, and is responsible for putting the message onto the bus. The ESB is then responsible for delivering the event message to any subscribers.

A subscriber is similar to an endpoint, except that instead of invoking against a single implementation, it invokes a list of "listeners," user-created instances that implement the Event interface, and that have been registered with the subscriber via an "addListener" method.

Request correlation involves asynchronous message exchange involving a callback. The caller provides a correlation identifier that uniquely identifies the request. The callback invocation passes the correlation ID back to the caller, which can use the ID to match the response to the original request.

In one embodiment, dynamic invoker/endpoint/subscriber factories are responsible for creating invokers, endpoints, publishers and subscribers as and when they are required, based on the service interfaces they wish to expose. They prevent the need for the above artifacts from being created at development-time, and creating unnecessary maintenance and deployment overhead. Within the scope of the SSI, the dynamic factories can be injected into components, and behave as regular invokers, endpoints, publishers and subscribers. This enables these components to interact with other services within the SSI.

In one aspect, the API client can include an SPFClient. The SPFClient is a component that is designed for use in code external to the SSI. It can be the component that the clients interact with when they wish to consume SSI services. While not required for an API client, an SPFClient abstracts away the details of instantiating and interacting with invokers, endpoints, publishers and subscribers. The SPF Client API wraps all the details of how to interact with the ESB components when sending/receiving data from the SSI itself For all message exchanges between the SPFClient, and other components within the SSI, XML can be used as the wire interchange format. This is to ensure that messages can be inspected, transformed and logged with maximum flexibility. Other wire formats (e.g. JSON, serialized Java objects) can be used for specific cases where warranted.

As noted above, in one aspect the SPF further includes a service registry. The Service Registry is the component that provides decoupling of a service invoker, and the EPR (Endpoint Reference) the service invoker delivers its requests to. Even though the association between an endpoint and a service is 1:1, multiple endpoints can be associated with a single service, and the registry entries are defined on a per-method basis, not per-service. In one aspect, the service registry comprises two parts, a static part (known as the service catalog) and a dynamic part (known as the runtime registry).

The service catalog stores the static information about the service. Like a federated model, as known to one of ordinary skill in the art, the service catalog is shared across all SSI instances that share the same set of services for a particular deployment. Static information can include, for example: service name—the name of the service, typically represented as an HTTP URL (as created by the JAX-WS/JAX-B WSDL tools); service roles—the security roles associated with a particular service such that the caller must have permission to these roles in order to execute the service; service classifications—an extensible field that allows any additional key/value pairs to be associated with the service name. Typical usage of this field could be to store, for example, the target system, the accuracy of the data, etc. A client application can optionally specify one or more classifications to resolve a service. The service registry can also be configured to define a set of default system classifications for all clients, or an individual client will have property to define a set of default classifications to be used for all services in that context.

The runtime registry stores dynamic information associated with a service. It is local to a single SSI deployed instance, and can store, for example, the endpoint reference(s) associated with the service for a particular SSI instance. An endpoint reference is unique to a particular SSI, and refers to a location on the ESB for the service. Typically, this will be a JMS reference, since the services in SSI are linked together using JMS. They could also be local bean references, OSGi Service Registry entries, HTTP URL's, etc. The runtime registry can also store service runtime data, which is similar to the "Service Classifications" in the static part. The runtime registry can store optional "additional attributes" for the runtime data for a particular service. Typical usage of this field could be to store, for example, time taken for the previous invocation, health (ping) information, etc. The runtime registry can also store a priority, which can be used to determine, when presented with multiple matches for a given service, which endpoint reference to return. Generally, the service with the highest priority wins. In one aspect, the runtime registry can store a client identifier, which can be used to determine, when necessary, the client system in which this endpoint is registered. An endpoint is registered in a client typically to implement callbacks, where the callback message is delivered to a particular Client.

In one aspect, the Service Provider Framework (SPF) further includes a runtime cache. In one aspect, the runtime cache is responsible for storing transient data, for the purposes of replicating it across a cluster if necessary. The technology used to implement this component can comprise a replicated cache architecture, as known to one of ordinary skill in the art. When data is written into one node in the replicated cache, all other nodes receive this data according to the cache propagation rules. This is traditionally implemented using "multicast groups", where all nodes in the same cache group operate on the same multicast group name.

When a group of SSI nodes form a cluster, all nodes can share the same runtime data, so that if a node fails, another node can continue the request. This equally applies to the service registry. If an SSI node fails, external components that were connected to the ESB (such as services, data adapters, clients, etc) can failover to another node in the cluster. When this happens, the new SSI node reflects the state of the service registry before the failure. By distributing the data using the runtime cache—this scenario is facilitated. In one aspect, the runtime cache can be used to store data for the runtime state, such that each cluster node has its own runtime cache instance.

As described herein, in one aspect a SSI client API is an Application Programmers Interface (API) that enables client applications to interact with services hosted on an Enterprise Service Bus (ESB). In one aspect, embodiments of the described client API abstract away the code necessary to interact with the ESB, the transport, and the message format, so that the client application only needs to interact with the service via a language-based (e.g., Java, .NET) interface. Embodiments of the described client API provide components that enable service implementations to be accessed in this way, supporting "Request/Reply" and "Publish/Subscribe" Message Exchange Patterns (MEPs).

As described herein, in one aspect the SSI client API is built on, and leverages the technology provided by a mediation routing engine (such as, for example, Apache Camel available from The Apache Software Foundation, Forest Hill, Md.) to interact with distributed components via an ESB architecture. The SSI client API adds an extra layer of functionality on top of the mediation router, to allow clients and service implementations to communicate without knowledge of the technologies used at runtime to connect them. In one aspect, the SSI client API is split into two main components; the SPFClient component (used by clients), and dynamic bus components and factories (used by clients and implementations).

In one aspect, the client API comprises an interface definition. Defined in WSDL (Web Services Definition Language), the interface definition describes the operations and parameters for a given service. For use in the Client API, this WSDL document is passed through a code generation tool. For the Java programming language, this tool is called WSDL2Java, and generates Java interfaces, and holder classes for the Request/Response object types for a given service. These Java interfaces are annotated with extensions provided by the JAX-B (Java XML-Binding) specification. These annotations describe the XML artifacts to generate when instances of these Java Interfaces are serialized into XML. A similar process can occur for other languages (e.g. Microsoft .NET). These language-based artifacts are used by the developer to transfer data between a client and an implementation.

In one aspect, a design pattern used in an embodiment of the client API is called the "endpoint and invoker" pattern. An endpoint is a component that "listens" on the Mediation Router—it receives messages via JMS, HTTP, in-memory, etc. for a service, and invokes the implementation, returning results (if any). An endpoint is primarily responsible for two tasks: marshalling the data from the wire format (if necessary) into language-based objects (e.g. Java, .NET), and the reverse procedure for the response (if any); and invoking the service implementation component, and returning the response (if any). The actual transportation of the request/response "on the wire" is delegated to the Mediation Router. This configuration can be changed without affecting the endpoint component.

An invoker is the partner component to the endpoint. It is a language-based component that implements the service endpoint interface (SEI). In one aspect, when invoked it can perform tasks that include (optionally) performing a lookup in the SSI service registry for the component endpoint reference (i.e. where to send the request message); marshals the data from the language-format (e.g. Java, .NET) into the wire format (if necessary), and the reverse procedure for the response (if any); interacting with the Mediation Router to "deliver" the request message to the mediation router, and receiving the response (if any).

The above components describe a Request/Response MEP (which includes the two-way and one-way patterns). For a Publish/Subscribe MEP, two variants of the invoker and endpoint are used. They are similar, but with subtle differences. For instance, the publisher and an invoker are the same, except that the publisher never waits for a response—it is always one-way. Also, while clients typically use the invoker, the publisher is more likely to be used by service implementations, to publish an event to waiting clients. The subscriber and endpoint are similar, except that an endpoint is for a single implementation and the subscriber can invoke multiple implementations (known as "listeners"). While an endpoint is typically used by service implementations, the subscriber is more likely to be used by clients (or other consuming components), to receive event notifications. The client can register one or more "listeners"—components that implement the service event interface, and perform some task within the client/component.

The SPFClient component is used by a service consumer (e.g., a client), to interact with the Service Provider Framework (SPF), and obtain a reference to the required service interface. Internally, it establishes a router context, which configures the required bus components (Invokers, Endpoints, Publishers, Subscribers) to be used by the client application. The SPFClient then provides an API to access these bus components, e.g.:

>     MyExampleService ob=SPFClient.getService(MyExampleObjectService.class);

Expressed above in Java, it essentially defines: "give me an invoker that implements my interface."

The Client API creates bus components dynamically. That is, no pre-existing invoker, endpoint, publisher or subscriber class exists for each service interface. This is achieved through the use of dynamic factories. A dynamic factory uses the JAX-B annotations in the interfaces to create a suitable bus component at runtime. When the client or implementation interacts with an endpoint/invoker, etc, they are in fact interacting with a dynamically created bus component. For publishers and invokers, this is completely hidden, since the developer only interacts using the service endpoint interface (SEI). For endpoints and subscribers, the developer interacts via client API interfaces "Endpoint" and "Subscriber."

Embodiments of the present invention provide a separation of concerns—clients and implementations are able to focus on consuming or providing the actual service, rather than the details of how message data is exchanged. Furthermore, embodiments of the described invention allow third-party components and/or development teams to write ESB-based services without needing to learn how to interact with these technologies. Also, the mechanisms used to exchange message data can be changed at any time without impacting the client or implementation—either for future work, for performance reasons (different wire protocols, transport formats), or for security. Finally, the physical integration technology (e.g. the Enterprise Service Bus, or Messaging Middleware, etc) can be replaced without impacting the Client or Implementation. The only dependency is on the Mediation Router API. Even this can be encapsulated such that it can be "plugged in" to reduce dependencies.

While typically, interacting programmatically with services using a mediation router involves needing to know how to send and receive the message data to/from the router (e.g. the message format, and the API used to interact with the router). The technical effect of embodiments of the Client API described herein is to allow both clients and implementations to exist without knowledge of the fact that their messages are being exchanged over an ESB architecture.

Figure 5:
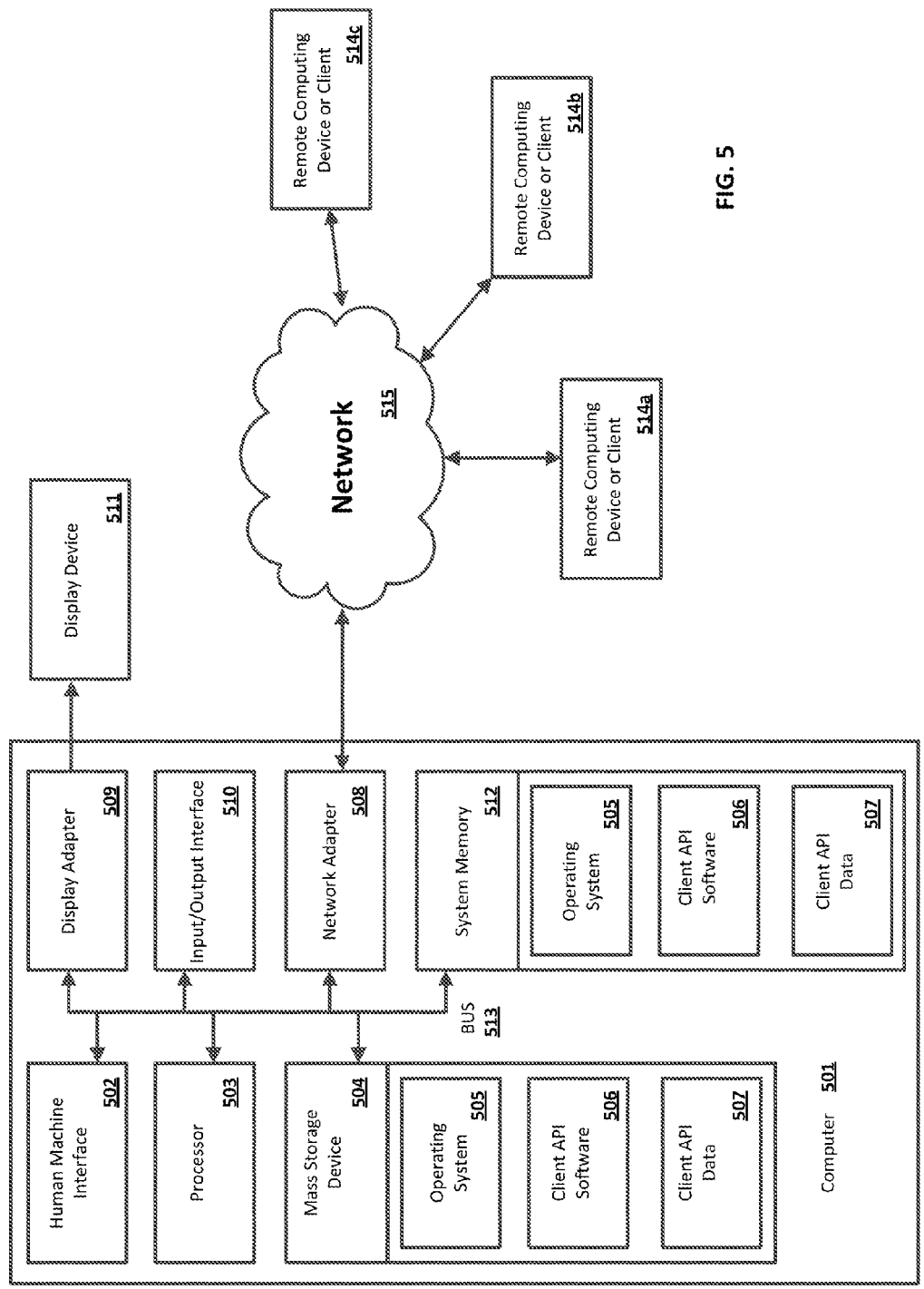
FIG. 5 is a block diagram illustrating an exemplary operating environment for performing the disclosed methods.

The above system (e.g., the client API 308 and the components of the SSI 300) has been described above as comprised of units. One skilled in the art will appreciate that this is a functional description and that software, hardware, or a combination of software and hardware can perform the respective functions. A unit, such as an application client 302 or a client API 308, can be software, hardware, or a combination of software and hardware. The units can comprise the client API software 506 as illustrated in FIG. 5 and described below. In one exemplary aspect, the units can comprise a computer 501 as illustrated in FIG. 5 and described below.

FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description, can also be implemented over a wired or wireless network connection and each of the subsystems, including the processor 503, a mass storage device 504, an operating system 505, client API software 506, client API data 507, a network adapter 508, system memory 512, an Input/Output Interface 510, a display adapter 509, a display device 511, and a human machine interface 502, can be contained within one or more remote computing devices or clients 514a,b,c at physically separate locations, connected through buses of this form (including an ESB), in effect implementing a fully distributed system or distributed architecture.

The computer 501 typically comprises a variety of computer readable media. Exemplary readable media can be any available media that is non-transitory and accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as client API data 507 and/or program modules such as operating system 505 and client API software 506 that are immediately accessible to and/or are presently operated on by the processing unit 503.

In another aspect, the computer 501 can also comprise other non-transitory, removable/non-removable, volatile/non-volatile computer storage media. By way of example, FIG. 5 illustrates a mass storage device 504 that can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and service registry software 406. Each of the operating system 505 and client API software 506 (or some combination thereof) can comprise elements of the programming and the client API software 506. Client API data 507 can also be stored on the mass storage device 504. Client API data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown), which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices or clients 514a,b,c. By way of example, a remote computing device can be a personal computer, portable computer, a server, a router, a network computer, a peer device or other common network node, and so on. Logical connections between the computer 501 and a remote computing device or clients 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and other networks 515 such as the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of client API software 506 can be stored on or transmitted across some form of non-transitory computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 6:
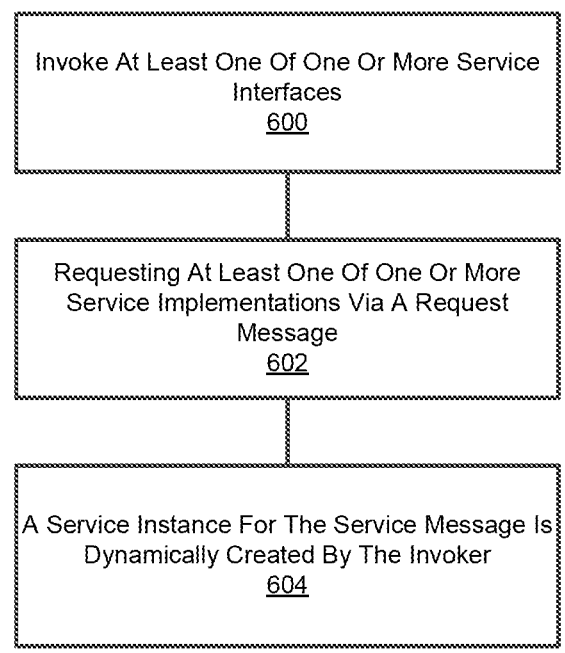
FIG. 6 illustrates an exemplary flowchart of performing the steps of implementing a client API in a service-oriented architecture (SOA).

As noted above, FIG. 5 is a block diagram illustrating an exemplary operating environment for performing methods of implementing a client API in a service-oriented architecture (SOA). FIG. 6 illustrates an exemplary flowchart of performing the steps of implementing a client API in a service-oriented architecture (SOA). Step 600 comprises executing, by a processor such as the one described above in reference to FIG. 5, application code to invoke at least one of one or more service interfaces. Invoking the service interface dynamically creates an invoker. Step 602 comprises requesting, by the application code executing on the processor, at least one of one or more service implementations via a request message. The request message comprises application code language based objects requesting a service (i.e., the request message is in the "native language" of the application code. At Step 604, the invoker dynamically creates a service instance for the service message. In one aspect, the service instance comprises the service message formatted for transport in the ESB and an endpoint reference for the selected service implementation as determined by a service registry. Generally, the endpoint reference for the service implementation is instantiated by a second processor by selecting a pre-existing endpoint reference on the ESB and configuring the endpoint reference for the requested service. In one aspect, the service instance can be sent by the processor to the endpoint reference via the ESB for the requested service. The second processor can receive the request message requesting the service; decode the request message into objects and invoke the service implementation; perform business logic associated with the request message; returning a result; encode the result into a response formatted for transport in the ESB; and return the response to the ESB where it travels to the application client. In one aspect, the processor of the client application can receive the response from the endpoint reference, decode the response into application code language based objects, and return the decoded response to the application code.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain. It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprised of:
    a first processor configured to execute an application client, wherein said application client further comprises application code, and one or more service interfaces;
    the first processor configured to provide an enterprise service bus (ESB) adapted to provide a canonical view of data, wherein said ESB further comprises a service registry; and
    a second processor configured to provide one or more service implementations, wherein said service implementations are connected with said application client through said ESB,
    wherein the first processor is configured to:
    execute said application code to invoke at least one of the one or more service interfaces;
    request at least one of the one or more service implementations via a first request message, wherein said first request message comprises first application code language based objects requesting a service;
    dynamically create a service instance for said service message, wherein said service instance comprises said service message formatted for transport in said ESB and an endpoint reference for the said at least one of the one or more service implementations as determined by said service registry, wherein the canonical view of data comprises a Smart Grid view, and wherein the first processor is configured to dynamically create a second service instance for a second request message, wherein the Smart Grid view comprises automatically transforming an advanced metering infrastructure (AMI) billing instance included in the first service instance into a AMI reading instance included in the second service instance.

2. The system of claim 1, wherein the second processor is configured to instantiate a pre-existing endpoint reference on the ESB and to configure said endpoint reference for the requested service.

3. The system of claim 2, wherein the first processor is configured to send the service instance to the endpoint reference via the ESB for the requested service.

4. The system of claim 3, wherein the second processor receives the first request message requesting the service; decodes the request message into objects and invokes the service implementation; performs business logic associated with the first request message; returns a result; and encodes the result into a response formatted for transport in the ESB, and returns the response to the ESB where it travels to the application client.

5. The system of claim 4, wherein the first processor is further configured to receive the response from the endpoint reference, decode the response into second application code language based objects, and return the decoded response to the application code.

6. The system of claim 1, wherein the first processor is configured to request a second of the one or more service implementations via a second request message, wherein said second request message comprises second application code language based objects requesting a service, and wherein the first application code language based objects are compiled byte-compiled, or interpreted in a different computing language than the second application code language based objects.

7. The system of claim 6, wherein the first application code language based objects are compiled byte-compiled, or interpreted in Java, and the second application code language based objects are compiled byte-compiled, or interpreted in C#.

8. A computer-implemented method comprising:
    invoking at least one of one or more service interfaces via an application code;
    requesting, by said application code, at least one of one or more service implementations via a first request message, wherein said first request message comprises first application code language based objects requesting a service; and
    dynamically creating, by an invoker, a service instance for said first request message, wherein said service instance comprises said first request message formatted for transport in an enterprise service bus (ESB) and an endpoint reference for the said at least one of the one or more service implementations as determined by a service registry, wherein the ESB is configured to provide a canonical view of data, wherein the canonical view of data comprises a Smart Grid view, dynamically creating, by the invoker, a second service instance for a second request message, wherein the Smart Grid view comprises automatically transforming an advanced metering infrastructure (AMI) billing instance included in the first service instance into a AMI reading instance included in the second service instance.

9. The method of claim 8, wherein requesting, by said application code the at least one of one or more service implementations via the first request message comprises instantiating a pre-existing endpoint reference on the ESB and configuring said endpoint reference for the requested service, wherein the requesting is executed in a first processor and the instantiating is executed in a second processor.

10. The method of claim 9, further comprising sending, by using the first processor, the service instance to the endpoint reference via the ESB for the requested service.

11. The method of claim 10, wherein sending the service instance to the endpoint reference via the ESB for the requested service further comprises using the second processor to:
receive the request message requesting the service;
decode the request message into objects and invoking the service implementation;
perform business logic associated with the request message;
return a result;
encode the result into a response formatted for transport in the ESB; and return the response to the ESB where it travels to the application client.

12. The method of claim 11, further comprising receiving, by using the first processor, the response from the endpoint reference, decoding the response into application code language based objects, and returning the decoded response to the application code.

13. The method of claim 8, comprising requesting, by said application code a second of one or more service implementations via a second request message, wherein said second request message comprises second application code language based objects requesting a service, and wherein the first application code language based objects are compiled or interpreted in a different computing language than the second application code language based objects.

14. A computer program product comprised of computer-executable code sections stored on one or more non-transitory computer-readable mediums, said computer-executable code sections comprising:
a first section for invoking at least one of one or more service interfaces;
a second section for requesting at least one of one or more service implementations via a first request message, wherein said first request message comprises first application code language based objects requesting a service; and a third section for dynamically creating, by an invoker, a first service instance for said first request message, wherein said first service instance comprises said first request message formatted for transport in an enterprise service bus (ESB) and an endpoint reference for the said at least one of the one or more service implementations as determined by a service registry, wherein the ESB is configured to provide a canonical view of data, wherein the canonical view of data comprises a Smart Grid view, wherein the third section comprises a code section for dynamically creating, by the invoker, a second service instance for a second request message, wherein the Smart Grid view comprises automatically transforming an advanced metering infrastructure (AMI) billing instance included in the first service instance into a AMI reading instance included in the second service instance.

15. The computer program product of claim 14, wherein the second section for requesting the at least one of one or more service implementations via a request message further comprises a code section for instantiating a pre-existing endpoint reference on the ESB and configuring said endpoint reference for the requested service.

16. The computer program product claim 15, further comprising the third section sending the first service instance to the endpoint reference via the ESB for the requested service.

17. The computer program product of claim 16, wherein the third section for sending the service instance to the endpoint reference via the ESB for the requested service further comprises receiving the request message requesting the service; decoding the request message into objects and invoking the service implementation; performing business logic associated with the request message; returning a result; encoding the result into a response formatted for transport in the ESB; and returning the response to the ESB where it travels to the application client.

18. The computer program product of claim 17, further comprising a fourth section for receiving the response from the endpoint reference, decoding the response into application code language based objects, and returning the decoded response to the application code.

* * * * *

UNITED STATES PATENT AND TRADEMARK OFFICE
CERTIFICATE OF CORRECTION

PATENT NO.       : 8,701,128 B2
APPLICATION NO.  : 13/026807
DATED            : April 15, 2014
INVENTOR(S)      : Daniel Ian Salt et al.

Page 1 of 1

It is certified that error appears in the above-identified patent and that said Letters Patent is hereby corrected as shown below:

On the Title Page:
Item (75) Inventor: change inventor name from:
"Augusto Remon Sellhorn"
to:
"Augusto Ramon Sellhorn"

Signed and Sealed this
Eighth Day of July, 2014

Michelle K. Lee
*Deputy Director of the United States Patent and Trademark Office*